United States Patent [19]

Yamauchi et al.

[11] Patent Number: 5,592,647

[45] Date of Patent: Jan. 7, 1997

[54] PTC PANEL HEATER WITH SMALL RUSH CURRENT CHARACTERISTIC AND HIGHLY HEAT INSULATING REGION CORRESPONDING TO HEATER LOCATION TO PREVENT LOCAL OVERHEATING

[75] Inventors: Masahiro Yamauchi; Takashi Kaimoto; Mitsuhiko Furukawa; Katsutoshi Rikihisa; Hironori Yoshida; Kenji Watanabe, all of Fukuoka, Japan

[73] Assignees: Nippon Tungsten Co., Ltd.; Kyushu Electric Power Co., Inc., both of Fukuoka, Japan

[21] Appl. No.: 39,114

[22] PCT Filed: Aug. 25, 1991

[86] PCT No.: PCT/JP92/01069

§ 371 Date: Apr. 8, 1993

§ 102(e) Date: Apr. 8, 1993

[87] PCT Pub. No.: WO93/04490

PCT Pub. Date: Mar. 4, 1993

[30] Foreign Application Priority Data

Aug. 26, 1991 [JP] Japan .................. 3-213969
Nov. 20, 1991 [JP] Japan .................. 3-305098

[51] Int. Cl.$^6$ .............................. H01C 7/02; H05B 3/14; H05B 3/20; F24D 13/02
[52] U.S. Cl. .................... 392/432; 219/505; 219/553; 501/137; 338/22 R
[58] Field of Search .................... 392/432–439; 219/505, 553; 338/22 R, 22 SD; 501/137–139; 252/521

[56] References Cited

U.S. PATENT DOCUMENTS

| | | | |
|---|---|---|---|
| 2,502,148 | 3/1950 | Grothouse | 392/435 |
| 3,118,042 | 1/1964 | Parker | 392/435 |
| 3,184,660 | 5/1965 | Robinson | 501/137 |
| 3,764,529 | 10/1973 | Matsuo et al. | 501/139 |
| 3,997,479 | 12/1976 | Shimojo et al. | 252/520 |
| 4,022,716 | 5/1977 | Ueoka et al. | 252/520 |
| 4,245,146 | 1/1981 | Shioi et al. | 219/505 |
| 4,384,989 | 5/1983 | Kamigaito et al. | 501/137 |
| 4,863,883 | 9/1989 | Menashi et al. | 501/137 |
| 5,030,386 | 7/1991 | Saxton et al. | 501/137 |

FOREIGN PATENT DOCUMENTS

| | | | |
|---|---|---|---|
| 49-27932 | 3/1974 | Japan . | |
| 51-30300 | 8/1976 | Japan . | |
| 51-32316 | 9/1976 | Japan | 338/22 R |
| 51-43584 | 11/1976 | Japan | 338/22 R |
| 52-9896 | 1/1977 | Japan | 338/22 R |
| 52-21730 | 6/1977 | Japan . | |
| 52-126438 | 9/1977 | Japan . | |
| 54-99961 | 8/1979 | Japan . | |
| 54-115445 | 9/1979 | Japan . | |
| 55-97143 | 7/1980 | Japan . | |
| 57-184205 | 11/1982 | Japan . | |
| 58-53176 | 3/1983 | Japan . | |
| 58-125665 | 7/1983 | Japan . | |
| 59-193395 | 12/1984 | Japan . | |
| 61-211626 | 9/1986 | Japan | 392/436 |

(List continued on next page.)

*Primary Examiner*—John A. Jeffery
*Attorney, Agent, or Firm*—Jordan and Hamburg

[57] ABSTRACT

A panel heater comprising, on an upper surface of a metallic sheet (2) provided with PTC ceramics (1) on the back side thereof, a highly insulating material or an open space (4) at the portion corresponding to the back side portion to which the PTC ceramics are provided, with a material (3) for conducting heat from the metallic sheet being thus provided to the rest of the surface side of said metallic sheet, and a finishing sheet (5) being established on the upper surface of the whole structure. More preferably, the metallic sheet (2) is provided with equally spaced concave grooves with PTC ceramics (1) on the back plane of said grooves and a highly insulating material or an open space (4) inside said grooves, and a finishing sheet (5) established thereon. Accordingly, a simply structured panel heater resistant to heavy loads yet free from local overheating is provided.

6 Claims, 14 Drawing Sheets

FOREIGN PATENT DOCUMENTS

| | | |
|---|---|---|
| 61-256123 | 11/1986 | Japan . |
| 62-16994 | 1/1987 | Japan . |
| 63-117914 | 5/1988 | Japan . |
| 63-218184 | 9/1988 | Japan . |
| 63-168724 | 11/1988 | Japan . |
| 1-231383 | 9/1989 | Japan . |
| 2-243564 | 9/1990 | Japan . |
| 4-50311 | 4/1992 | Japan . |
| 4-190021 | 7/1992 | Japan .................................. 392/435 |

PTC PANEL HEATER WITH SMALL RUSH CURRENT CHARACTERISTIC AND HIGHLY HEAT INSULATING REGION CORRESPONDING TO HEATER LOCATION TO PREVENT LOCAL OVERHEATING

FIELD OF ART

The present invention relates to a PTC (positive temperature coefficient) thermistor device using a PTC thermistor element; more particularly, it relates to a panel heater.

BACKGROUND OF THE INVENTION

Panel heaters are now applied to various uses. In particular, panel heaters using PTC thermistors as heating elements are free from overheating, and hence enjoy advantages such as automatic self control of calorific value even under change of surrounding temperature. Accordingly, they are used as components for general use heaters, such as food warmers for hospitals, and for numerous other purposes. Technology of this type is disclosed as panel heaters in Japanese Unexamined Patent Publication No. 61-256123 and Japanese Unexamined Patent Publication No. 62-16994.

The panel heaters as disclosed in the aforementioned unexamined published Japanese patent applications, however, suffer problems. Those problems include the fluctuation of temperature due to local heat just above the heater; insufficient heat conduction from the heater element to the panel due to the presence of thermal resistance at the joint; the necessity of additional process steps, such as bolting, for the joints; and the need for a complicated structure of reinforcing materials which are incorporated into the heater to support the heavy load being applied from the upper side of the heating element.

Furthermore, on installing a panel heater comprising a combination of a PTC thermistor and a metallic heat radiation sheet to materials for walls and floors, a PTC thermistor sintered element capable of covering a large area is a requisite. In practice, however, large area panels are unfeasible, because such a large sintered element for a PTC thermistor will require great difficulties in manufacturing. Even if an alternative process for realizing a large area panel heater were to be taken, i.e., integrating smaller PTC thermistor sintered elements into a larger one, the process would be uneconomical and energy-insufficient. Moreover, such a sintered element obtained by integrating smaller pieces of PTC thermistor sintered elements is not practical, because a large heat emission occurs preferentially at the joint portions of the PTC thermistors with a metallic sheet.

An advantage of a PTC thermistor is a quick temperature rise which is realized as a consequence of the rush current (a large initial surge of current which is generated immediately after applying the current). However, the rush current from a plurality of PTC thermistors will accumulate into a large current that has unwanted effects such as activation of the breaker.

An object of the present invention is to overcome the prior art problems as mentioned hereinbefore, and to provide a simply structured panel heater resistant to heavy loads, and free from local overheating.

Because panel heaters are characterized by their thin sheet-like structure, they have been utilized as general use heaters, floor heating, etc. Accordingly, the PTC thermistor heaters tend to be used more frequently because they have a self control function for temperature, which provides enhanced safety.

Conventional PTC thermistor heaters for use in floor heating were planar heaters comprising a heat-resistant insulating organic material having conductive materials such as carbon particles dispersed therein.

Those conventional planar heaters, however, suffered the following drawbacks: (1) Lack of stability in heat emission—the contact state of the conductive material particles changes along with the changing temperature, providing no assurance that the initial contact state will recover upon return to the initial temperature; (2) Non-uniform heater temperature—as mentioned above, because the contact state of the conductive particles is non-uniform, the electric resistance differs from one place to another; and (3) Difficulty in placing the panel heater—because virtually the entire front panel is covered with a heating element, the positions for safely nailing up the panel are highly restricted.

Accordingly, a second object of the present invention is to provide a panel heater which stably emits heat without suffering non-uniform temperatures, and which can be freely fixed to a floor using a nail or the like. Furthermore, it is also an object of the present invention to shorten the transient time from when the electric source is turned on to the point the rush current reaches the panel heater.

A PTC thermistor has a low initial resistance, and it is known that a large rush current generates on it when it is used as a heating element. Accordingly, a larger current capacity is required for the initial stage than that required for the stationary state. This signifies that, when a PTC thermistor is applied to panel heaters or other uses which require a large output, the output and the number of panel heaters must be confined to a certain range.

To cope with the above problems, much effort has been put into reducing the rush current to as low a value as possible.

Such efforts are described in Japanese Unexamined Patent Publication No. 55-97143, in which a PTC thermistor being serial connected with a negative temperature coefficient thermistor is disclosed, or in Japanese Unexamined Patent Publication No. 54-115443, in which an ohmic contact being connected with a non-ohmic contact is disclosed. Furthermore, Japanese Unexamined Patent Publication No. 49-27932 discloses a combined use of PTC thermistors differing in Curie point, and Japanese Unexamined Patent Publication No. 63-218184 discloses the use of a phase temperature control device.

The conventional techniques as cited above are disadvantageous in that they incorporate additional process steps that make the circuit more complicated. In particular, panel heaters and the like as disclosed in Japanese Unexamined Patent Publication No. 49-27932 suffer from considerable temperature fluctuation.

A third object of the present invention is, therefore, to control the rush current by the thermistor itself without using any additional circuits and elements.

Heating elements obtained by joining and electrically connecting a plurality of PTC thermistors with two electrodes are used practically in such items as fan heaters, hair driers, and bedding driers. The output power of a device using such a heating element is controlled by the placement of a plurality of those heating elements each composed of PTC thermistors joined and connected with two electrodes, and thus applying the current to only the selected heating elements. The output power is thus controlled by the number of heating elements to which the current is applied.

However, to increase the output in heating elements of the above type, a larger number of heating elements must be incorporated. The installation of these additional elements will require not only more space, but higher cost as well.

A fourth object of the present invention is, therefore, to provide a PTC thermistor heater composed of a plurality of PTC thermistors which are integrated into a single heating element, capable of changing the output by itself.

A fifth object of the present invention is to avoid loss of strength of the PTC thermistor heater due to the spaces which results from the PTC thermistor elements being arranged leaving spaces in the heating element, and also to prevent fire or breakage from occurring due to a short circuit.

SUMMARY OF THE INVENTION

The first object of the present invention can be achieved by realizing a panel heater as follows. That is, the present invention provides a panel heater comprising: a metallic sheet provided with PTC ceramics on the back plane thereof; a high heat insulating material or an open space on the surface side of said metallic sheet, at the portion corresponding to the portion on the back side which has the PTC ceramics; materials for conducting heat from the metallic sheet, each arranged to predetermined positions on the surface side other than those positions at which the heat insulating material or the open space is provided; and a finishing sheet being provided on the surface side of said materials for conducting heat from the metallic sheet. The present invention also provides a panel heater comprising a metallic sheet having provided thereon concave grooves at predetermined spaces by bending, with PTC ceramics being placed on the back side of said concave grooves and a heat-insulating material or a space being placed inside said concave grooves, and a finishing sheet being placed on the outermost surface of the structure.

In another embodiment, a plurality of PTC ceramics may be divided arbitrarily into groups, and a thermostat placed in each of said groups. In such a structure, the thermostat provided to the first group of PTC ceramics closes first on application of a current for elevating the temperature of the PTC ceramics, and hence the current thereafter is applied to the PTC ceramics in the next group. With such a structure, the current may be applied sequentially to the PTC ceramics in the next group.

The metallic sheet is heated by applying current to the plurality of PTC ceramics which are adhered to the back side of the metallic sheet. The heat propagates through the metallic sheet by conduction, but a stationary state of non-uniform temperature is realized because the joint portion of the metallic sheet with the PTC ceramics is maintained at the highest temperature while the portion furthest from the joint remains at a low temperature. Thus, the panel heater according to the present invention comprises a material for conducting heat at low temperature portions furthest from the joint portion of the metallic sheet with the PTC ceramics, and a heat-insulating material or an open space at high temperature portions which correspond to the vicinity of the joint portion of the metallic sheet with the PTC ceramics. In this manner, the finishing sheet provided to the surface of the whole structure receives more heat at portions furthest from the joint portion of the metallic sheet with the PTC ceramics by allowing the heat to be more conducted to these portions, while it is less heated at the portion of the finishing sheet just above the joint portion of the metallic sheet with the PTC ceramics by allowing the heat there to be less conducted. Thus, the uneven temperature of the finishing sheet can be made more uniform. In an embodiment in which an open space is provided to the upper side portion corresponding to the joint portion of the PTC ceramics with the metallic sheet, the heat generated from the joint can be conducted to remote portions by the convection of air if a space connecting the remote portions with the aforementioned open space is provided. In this manner, the unevenness of the temperature can be further reduced.

To prevent an excess rush current from occurring when heating the entire PTC ceramics, the PTC ceramic elements are divided into a plurality of groups each having a thermostat provided thereto. Then, current can be applied sequentially to the groups of PTC ceramics using the thermostat.

The second object of the present invention can be achieved by a thin sheet panel heater comprising PTC ceramic elements. The thin sheet panel heater according to the second embodiment of the present invention comprises a panel having a concave portion provided on the upper surface thereof to accommodate therein the heating elements, connection wires, etc.; a plurality of heating elements comprising ceramic heaters and components such as connection wires attached thereto; and a heat radiation sheet to cover the entire surface of the panel.

In the structure above, the plurality of PTC ceramic elements being incorporated between the upper and the lower electrode sheets may be divided into a number of groups so that the PTC elements within a group may be brought into intimate thermal contact with each other.

The heating element for use in the panel heater according to the present invention comprises heaters made of PTC ceramics, (for example, barium titanate ($BaTiO_3$)). Barium titanate is a semiconductor ceramic having a positive temperature coefficient of resistance. The electrical resistance of the barium titanate sintering increases non-linearly with an elevating temperature by applying a current thereto, as to reach a value 10,000 times that of the room temperature at a temperature not lower than the Curie point. Over this temperature, the ceramics will turn into an insulator that will not conduct current. Consequently, the temperature of the sintering element is maintained constant at a temperature slightly higher than the Curie point. It is well known that the Curie point can be freely controlled by adding elements such as lead and strontium to the ceramic sintering element.

The PTC ceramic element thus obtained is characterized in that it has self controlling functions for both temperature and power output. The former function assures safety, while the latter largely contributes to saving energy. Accordingly, as these elements have been long used as heating elements for fan heaters, hair driers, driers for bedding, etc., the stability and durability of the PTC ceramic elements are now well established.

It can be therefore be said that the PTC ceramic elements are best suited for use in panel heaters for home-use floor heating.

For easier fabrication and temperature control, the aforementioned heating element is preferably constructed from a plurality of small PTC ceramic element blocks. In general, such PTC ceramic elements are arranged at even spacing. However, the resulting heating element will take longer to attain the Curie point because the heat generated on each of the PTC ceramic elements is consumed for heating the electrodes which cover the large area. Thus, it happens that, the rush current, i.e., the transient current which is larger than that which is generated in a stationary state after the power source has been turned on, remains longer for a heating device equipped with a larger number of PTC elements. As a means to overcome this problem, the PTC ceramic elements are arranged, not by equal spacing, but by combining them into a plurality of groups and bringing the elements closer to each other within each of the groups. In this manner, the temperature of each of the elements can be more rapidly increased, and the transient state corresponding to the rush current, i.e., the period between when the power source is turned on and when the stationary temperature is achieved, can be minimized.

The third object of the present invention can be achieved by a panel heater equipped with a PTC thermistor which satisfies the following relation on applying an AC voltage of 100±5 V: P×R≧2.0×10$^4$ (W·Ω), wherein P(W) represents the output power in a stationary state at room temperature, i.e., at 25° C., and R(Ω) represents the resistance before applying the voltage (nominal resistance).

In the panel heater according to the present invention, the product of the resistance and the output of the PTC thermistor is restricted to a certain value or higher to considerably reduce the rush current. The reason for defining the relation P×R≧2.0×10$^4$ (W·Ω) is explained below.

FIG. 11 shows the change in current of PTC heaters with the passage of time. The PTC heaters used herein are those having a nominal resistance of 50, 70, 110, 165, 200, and 260 Ω. In the figure, the characteristic curve marked with c is for a heater having a resistance of 110 Ω. It can be seen that the rush current in this heater amounts to 1.25 times the current at the stationary state, and that it reaches a peak after the passage of 3 minutes. Considering the functioning characteristics of a home-use breaker, which operates only after the passage of 4 minutes under a current amounting to 125% of the rated current, the heater above can be operated without activating the breaker. Accordingly, the characteristic curve marked with c was referred to as critical characteristics.

The fourth object of the present invention can be achieved by a PTC heater comprising a plurality of PTC thermistors each having one of the poles electrically connected with a common principal electrode, and the other pole selectively with electrodes for applying a current so that the functioning thermistors can be selected, provided that the electric connections with the plurality of electrodes are not superposed in the same plane for a single thermistor.

The fourth object of the present invention can be achieved by another PTC heater comprising a plurality of PTC thermistors each having each of the poles electrically connected with electrodes to select the functioning thermistors, provided that the electric connections with the plurality of electrodes are not superposed in the same plane for a single thermistor.

In general, the PTC heaters are used by attaching the PTC thermistors to a pertinent heat-radiant member, incorporating therebetween an electrode. It is known that the radiant heat, i.e., the power output, differs depending on the area of the PTC thermistor to which the electric current is applied for elevating the temperature, and that the radiant heat or the power output is higher for a larger area of the thermistor. Thus, when a plurality of PTC thermistors are integrated into a single heating element, the radiant heat and the power output of the heating element can be varied by changing the number of PTC thermistors to which the current is applied. This can be achieved by a structure comprising a plurality of flat PTC thermistors, each thermistor being connected to one or more electrodes for applying a current to one of the two principal planes thereof and two or more electrodes to the other plane, provided that the plurality of electrodes for applying the current is arranged in such a manner that the electric junctions are not superposed on each other for a single thermistor.

In the structure above, a desired PTC thermistor can only be heated by applying a current to the two electrodes, each one being selected from the electrodes connected to each of the two principal planes.

By thus selecting one electrode each from those provided to each of the two principal planes and combining them, the number of the exothermic PTC thermistors can be changed to control the radiant heat and the power output of the entire heater.

The fifth object of the present invention can be achieved by a PTC heater device comprising a plurality of PTC elements being arranged with a predetermined spacing between one another and being incorporated between parallel upper and lower band-shaped electrode sheets, wherein an insulator material is provided to the open space corresponding to said spacing.

In the present invention, an insulating sheet having a thickness approximating that of the PTC element was placed in the space between the upper and the lower parallel electrode sheets. Because the electrode sheets are supported by the insulating sheet in this manner, the electrode sheet is free from bending even when a load is applied to the PTC elements.

DESCRIPTION OF THE PREFERRED EMBODIMENTS

The present invention will be explained in further detail referring to the examples and attached figures.

EXAMPLE 1

Figure 1:
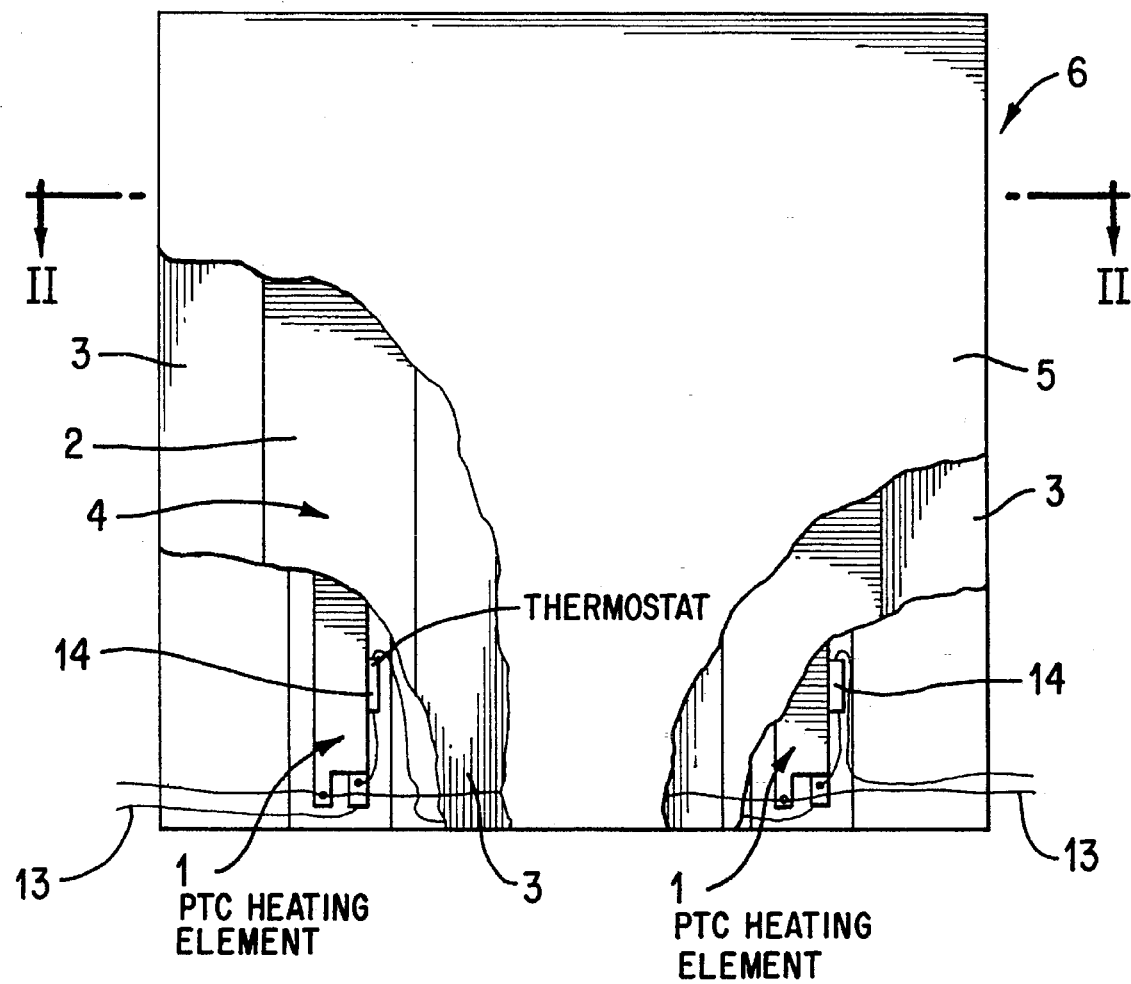
FIG. 1 is a planar view, with parts broken away, of a panel heater according to Example 1 of the present invention.

FIG. 1 is a planar view with parts broken away of a structure comprising a metallic sheet 2 having joined thereto a PTC heater element 1 with an iron finishing sheet 5 being provided thereon, and an aluminum heat conductor sheet 3 and an open space 4 being incorporated therebetween. The finishing sheet may be a material other than a metal.

A thermostat 14 is provided at the vicinity of the PTC element 1 to control the current which is applied to the neighboring PTC heating element. In this manner, electric current is applied to the next PTC element which is provided adjacent to the PTC heating element 1 only after the temperature of the PTC heating element 1 exceeds a previously set value.

The flooring material 6 may be connected as desired using connection 13, so that, as a whole, a parallel connection is provided.

Figure 2:
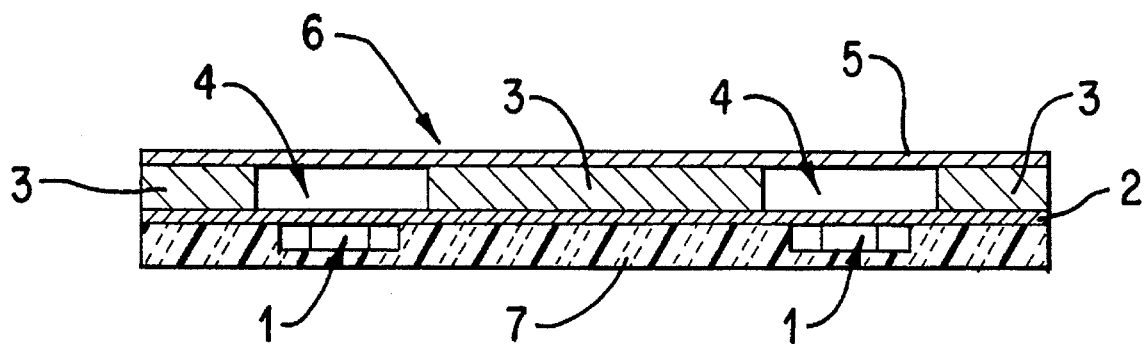
FIG. 2 is a cross-sectional view of the panel heater taken along line II—II shown in FIG. 1.

FIG. 2 details the cross-sectional structure of the PTC panel heater, as taken along line II—II of FIG. 1. As is shown in FIG. 2, the metallic sheet 2 having the PTC heating element 1 adhered thereon is fixed on a heat insulating material 7, and an open space 4 is provided at the vicinity of the joint portion of the metallic sheet 2 with the PTC heating element 1, while an aluminum heat conductive plate 3 is fixed to the portion remote from the joint portion with the PTC heating element 1. An iron finishing sheet 5 is provided to cover the whole structure.

The heat conductive plate 3 may be composed of a plurality of metallic sheets, but not necessarily of a heat conductive material such as a metal. It may also comprise features such as holes and grooves which can communicate with space 4.

Figure 3:
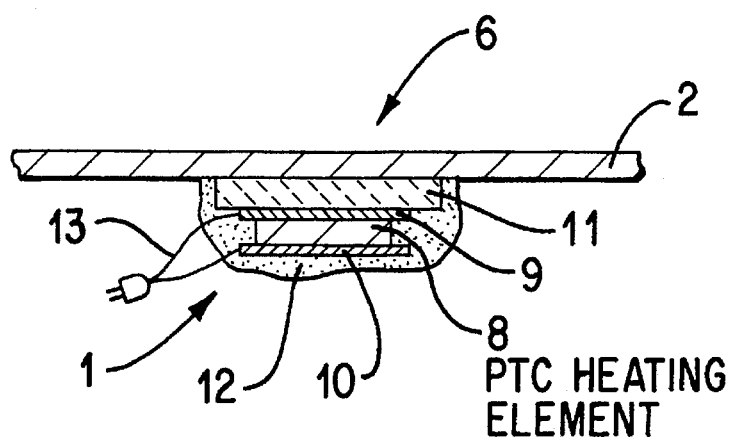
FIG. 3 is an explanatory figure of a structure having a PTC heater shown in FIG. 1 being attached thereto.

FIG. 3 shows the detailed structure of the PTC heating element 1 as it is adhered to the metallic sheet. In general, the PTC heating element 1 comprises a plurality of PTC thermistor sintered elements 8. In the same figure, there can be seen aluminum electrodes 9 and 10 being attached to the upper and the lower surfaces of the PTC thermistor sintered elements 8. Those electrodes emit heat on the application of a current thereto using a connection 13. A ceramic insulator board 11 is attached to the upper aluminum electrode using a heat-resistant adhesive 12. The resulting structure is placed under the metallic sheet 2.

Figure 4:
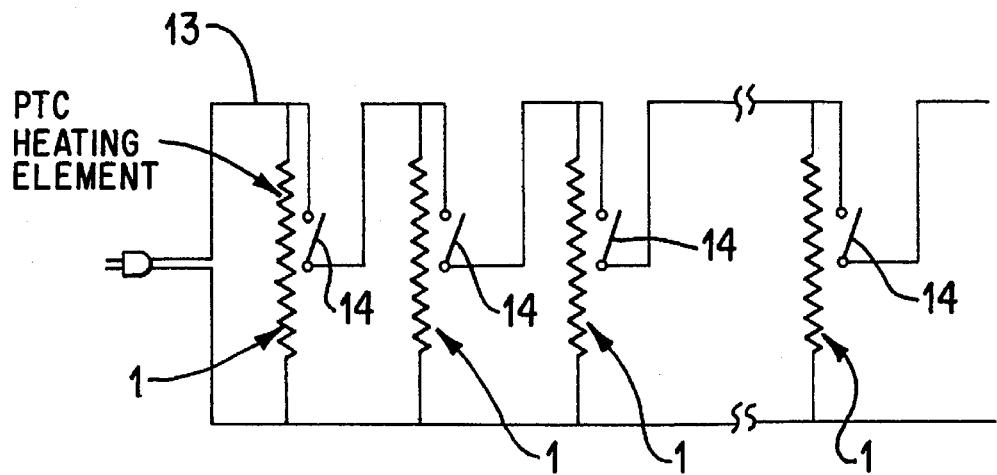
FIG. 4 shows the connections between the PTC heater shown in FIG. 1 with a thermostat.

FIG. 4 shows the connection between the PTC heating element and the thermostat for controlling the current. A thermostat 14 is provided at the vicinity of a PTC heating element 1 that, upon heating the PTC heating element 1, by applying thereto a current, to a predetermined temperature or higher, the thermostat 14 closes to apply a current to the adjacent PTC heating element to initiate the heating thereof.

In the arrangement shown in FIG. 4, the PTC heating elements are heated sequentially from the left side. By lowering the rush current of the PTC heating element by controlling the resistance and such thereof, the thermostat 14 need not be connected to each of all the PTC heating elements, but simply installed in the vicinity of a particular plurality of PTC heating elements. In practice, panel heaters according to the present invention are set and fixed to the floor in the desired numbers, connected electrically, and covered with a finishing material, a carpet, etc.

EXAMPLE 2

Figure 5:
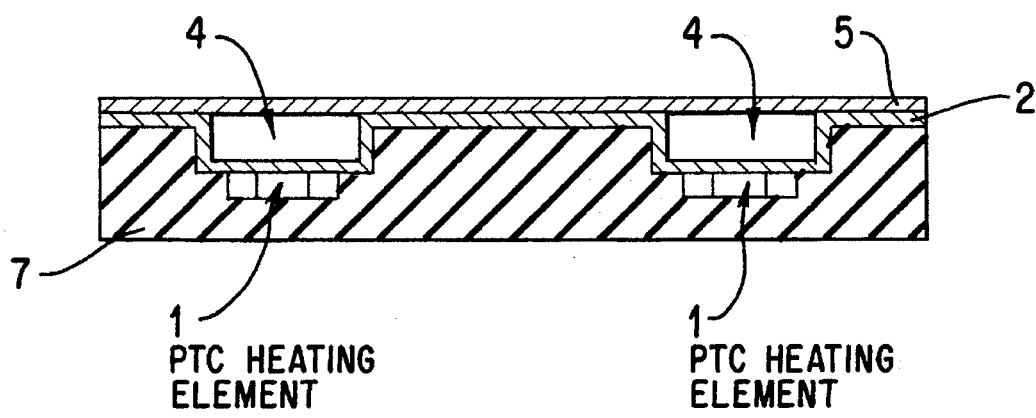
FIG. 5 is an explanatory cross sectional view of a panel heater according to Example 2 of the present invention.

FIG. 5 is a cross sectional view taken at the edge of a panel heater according to Example 2, which comprises a metallic sheet provided with stripe grooves. In this type of a panel heater, a PTC heating element 1 is adhered to the back of the stripe grooves, and an open space 4 is provided inside the grooves. A finishing sheet 5 covers the stripe grooves incorporating therebetween the open space 4, and the metallic sheet at portions other than the stripe grooves.

EXAMPLE 3

Figure 6:
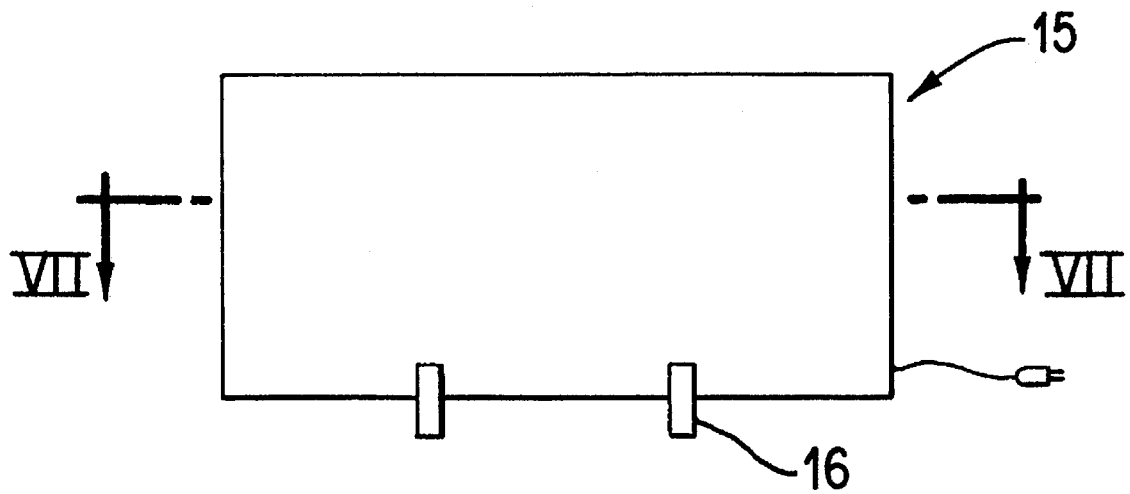
FIG. 6 is a front view of a panel heater according to Example 3 of the present invention.
Figure 7:
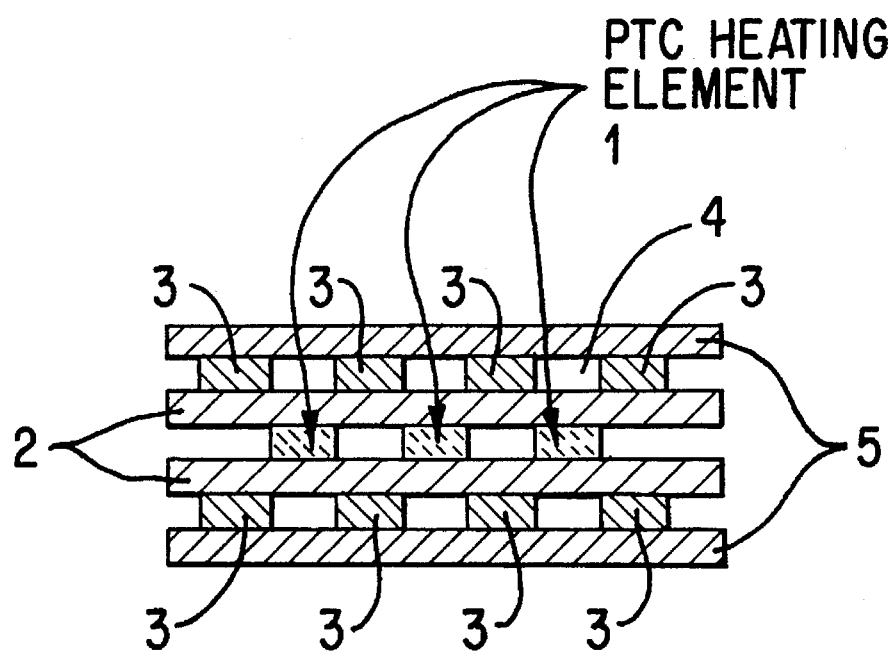
FIG. 7 is a cross sectional view of the panel heater taken along line VII—VII shown in FIG. 6.

FIG. 6 is a front view of an embodiment according to Example 3 of the present invention, which comprises a panel heater 15 being fixed to a support 16. FIG. 7 is a cross-sectional view of the structure taken along line VII—VII of FIG. 6. Three heating elements 1, each comprising a plurality of PTC thermistors, are sandwiched between two aluminum internal heat radiation sheets 2 and joined. The internal heat radiation sheets 2 are joined with aluminum external heat radiation sheets 5, with aluminum heat conductive sheets 3 being incorporated therebetween. An open space 4 is provided on each of the portions of the internal heat radiation sheets to which the heating element 1 is attached, so that the heat from the heating element 1 will not be conducted directly to the external heat radiation sheet 5. Thus, the open space 4 not only functions as a funnel to provide a higher heat radiation, but also provides a clean and safe panel heater which is free from accidents such as burning. This can be achieved by selecting a material having an appropriate Curie point for the PTC thermistor, and thereby preventing local overheat from occurring on the external heat radiation sheet 5.

As described in the foregoing, the present invention provides a panel heater equipped with a PTC thermistor as the heating element. Because the PTC thermistor itself has an automatic self temperature control function, the resulting panel heater controls the power consumption in accordance with the outer temperature. Thus, the panel heater is not only safe, but also energy efficient. The metallic sheet is monolithic, and hence it provides high heat conductivity to prevent the heat from being conducted directly to the finishing sheet from the heating element. Accordingly, the metallic sheet suffers no local overheat, and, although it has a large area and a simple layered structure, it resists a large load without incorporating any reinforcements or the like.

Furthermore, an excess rush current can be avoided by using a structure comprising the heating elements being divided into a plurality of groups each provided with a thermostat. By using such a structure, each group of heating elements can be heated sequentially by applying the sequential current.

EXAMPLE 4

Figure 8:
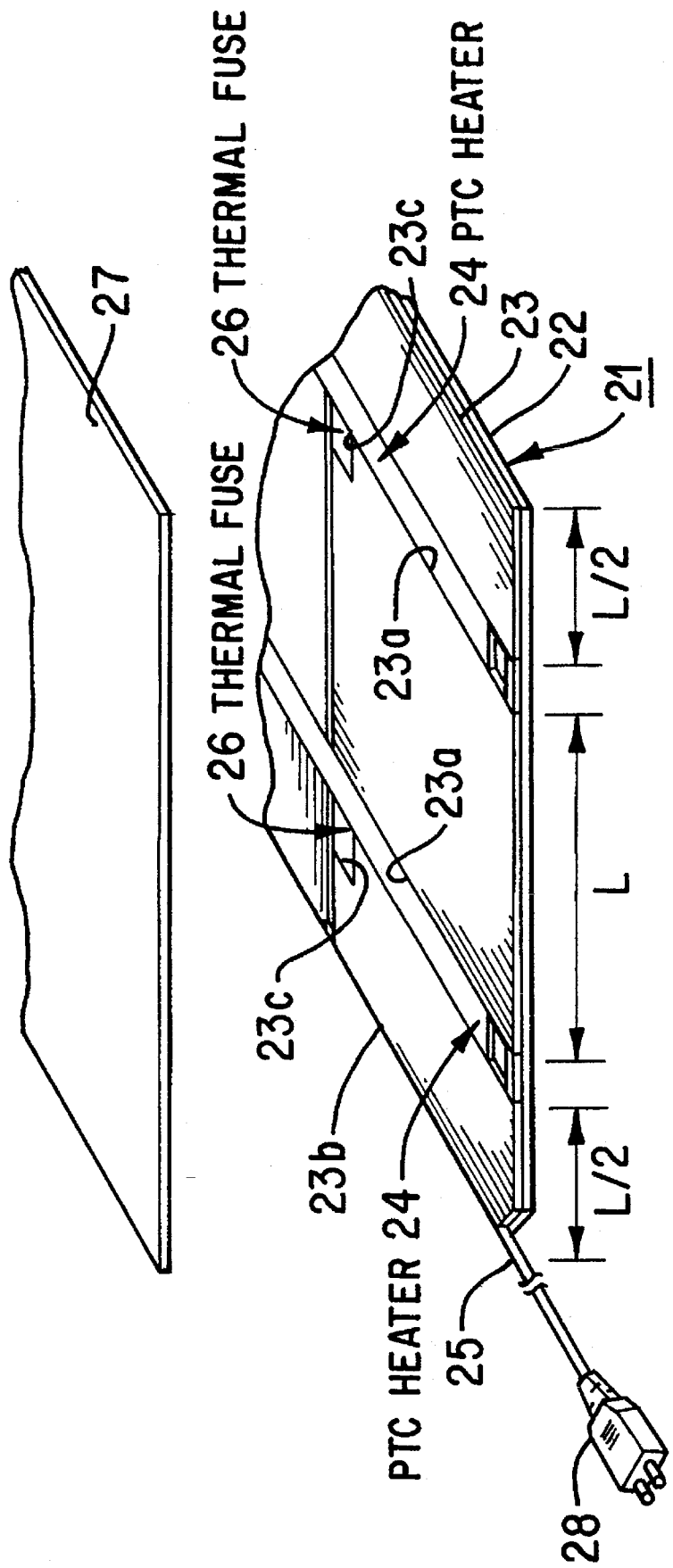
FIG. 8 is an exploded perspective view of a panel heater according to Example 4 of the present invention.

FIG. 8 is an exploded perspective view of the panel heater according to Example 4 of the present invention, which comprises a panel 21. In the present Example, the panel 21 comprises a lower base panel 22 made of plywood, etc., which is laminated with another panel 23 made of the same material. To the upper panel 23 are provided a plurality of notches (two notches in the present example) 23a to accommodate therein band-shaped heating elements and accompanying components such as connections. Then, a band-shaped heating element 24, a connection 25, and a thermal fuse 26 are each placed inside the notches 23c, respectively, and connected. The whole structure thus obtained is then covered with a heat radiation sheet 27 such as one made of aluminum, and finished into a panel heater by adhering them together. A plug 28 to supply electric power to the panel heater from an electrical outlet is also provided along edge 23b.

Figure 9A:
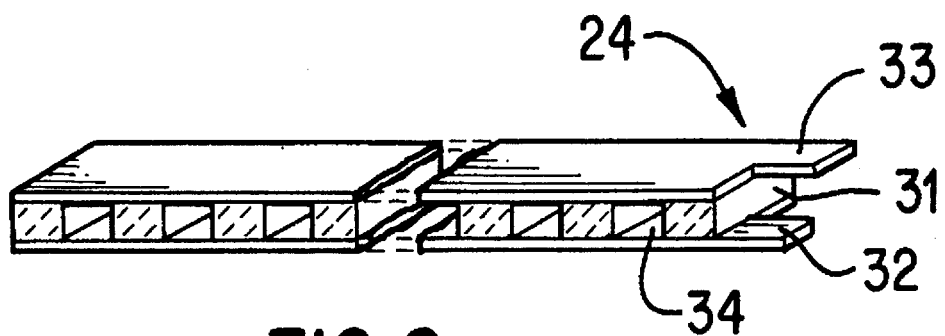
FIGS. 9a, 9b and 9c are perspective views of various types of band-shaped heating elements.
Figure 9B:
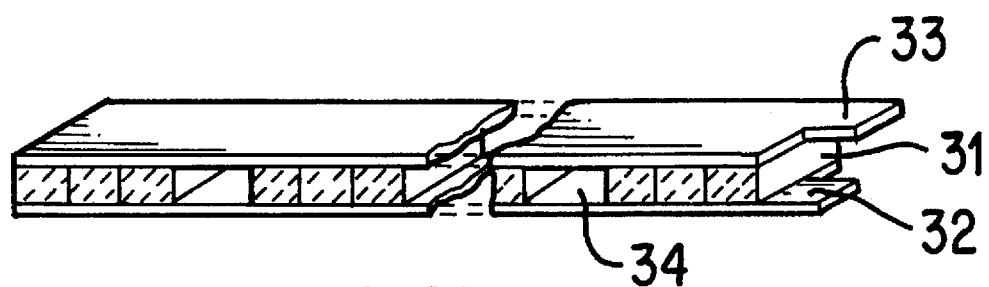
Figure 9C:
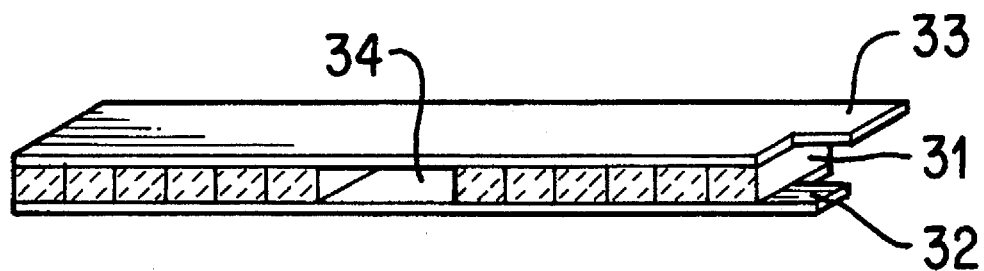

FIGS. 9a, 9b and 9c are perspective views of various types of band-shaped heating elements. The structure shown in FIG. 9(a) comprises a plurality of PTC ceramic elements 31 equally spaced out at a spacing 34 and being arranged between upper and lower electrode sheets 32 and 33. The PTC ceramic elements 31 are adhered to the upper and the lower electrode sheets 32 and 33. The structure shown in FIG. 9(b) comprises a plurality of PTC ceramic elements 31 being divided into three or more groups, with the elements in each group being brought into close contact with the others within the group. FIG. 9(c) illustrates an extreme case which comprises two groups of PTC ceramic elements, where the groups are widely separated from each other; i.e., one at each end of the structure.

Figure 10:
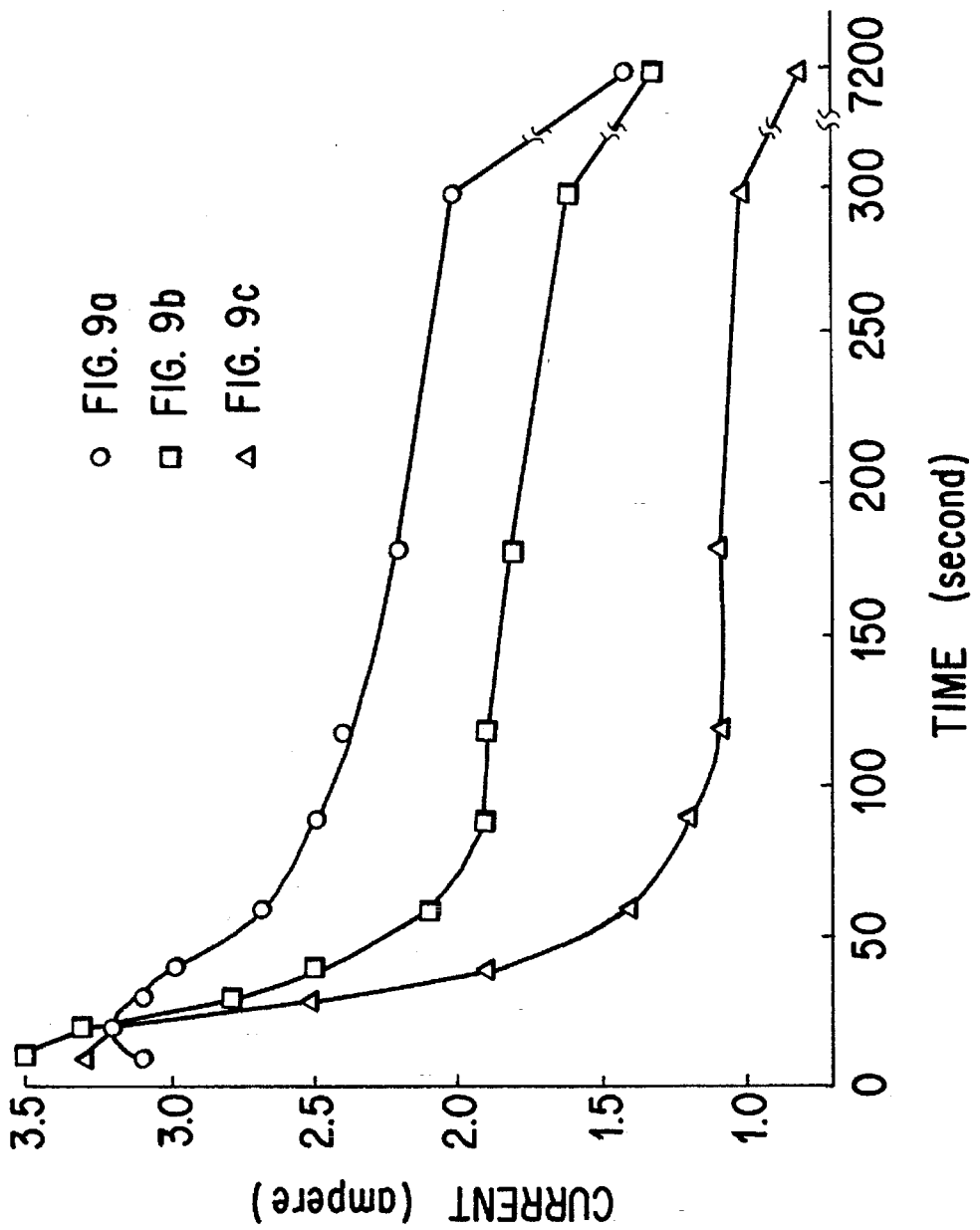
FIG. 10 is a graph showing the change of current with the passage of time for each of the heating elements differing in structure.

FIG. 10 shows the change of current upon application of rated voltage to the panel heater comprising the PTC ceramic elements 31 arranged as described above. As can be seen from the figure, the structure comprising the equally spaced PTC ceramic elements as shown in FIG. 9(a) takes 300 seconds or longer to achieve a current of 2 A from the initial current in the range between 3 and 4 A. In the case of a structure as shown in FIG. 9(b), which comprises three heating elements composed of PTC ceramic elements, the corresponding transient time is reduced to about 60 seconds, and in the structure having two heating elements as shown in FIG. 9(c), the transient time is further reduced to a mere 40 seconds. This is because the heat generated by the PTC ceramics is less diffused in the structures as shown in FIGS. 9(b) and 9(c). Accordingly, the temperature rises more rapidly in the PTC elements arranged in such structures, and the elements thereby attain the Curie point faster and have a shorter rush current period.

It should be noted, however, that in the arrangement shown in FIG. 9(c), it becomes difficult to achieve a uniform temperature over the panel. It is therefore necessary to determine the number of elements per group to obtain an optimum rush current period and a uniform temperature over the whole panel.

As mentioned in the foregoing, the Example according to the present invention provides the following advantages:

(1) A safe and durable panel heater is provided, because PTC ceramic elements, which are more stable in heat emission, are used as the heating elements;

(2) A low cost panel heater is provided by a simpler process, because plywood is used as the base panel;

(3) A panel resistant to heavy loads is provided, because the heating elements are buried inside the plywood base panel, and thereby the load of the flooring is applied to the plywood;

(4) A panel with excellent electrical and heat insulation is obtained, because the heating elements are buried inside the plywood;

(5) A panel heater which can be easily attached to the floor is provided, because the panel may be nailed at almost any place as desired; and (6) A panel heater having a considerably reduced rush current period is obtained by placing the plurality of PTC ceramic elements in a particular group arrangement; accordingly, a number of panel heaters can be used at once and yet with a quick temperature rise, without activating the breaker.

EXAMPLE 5

The present Example provides a panel heater having a considerably reduced rush current of about 30 to 70% of that of a conventional one. This was achieved by modifying the characteristics of the PTC elements and increasing the resistance per unit output of the panel heater.

Figure 11:
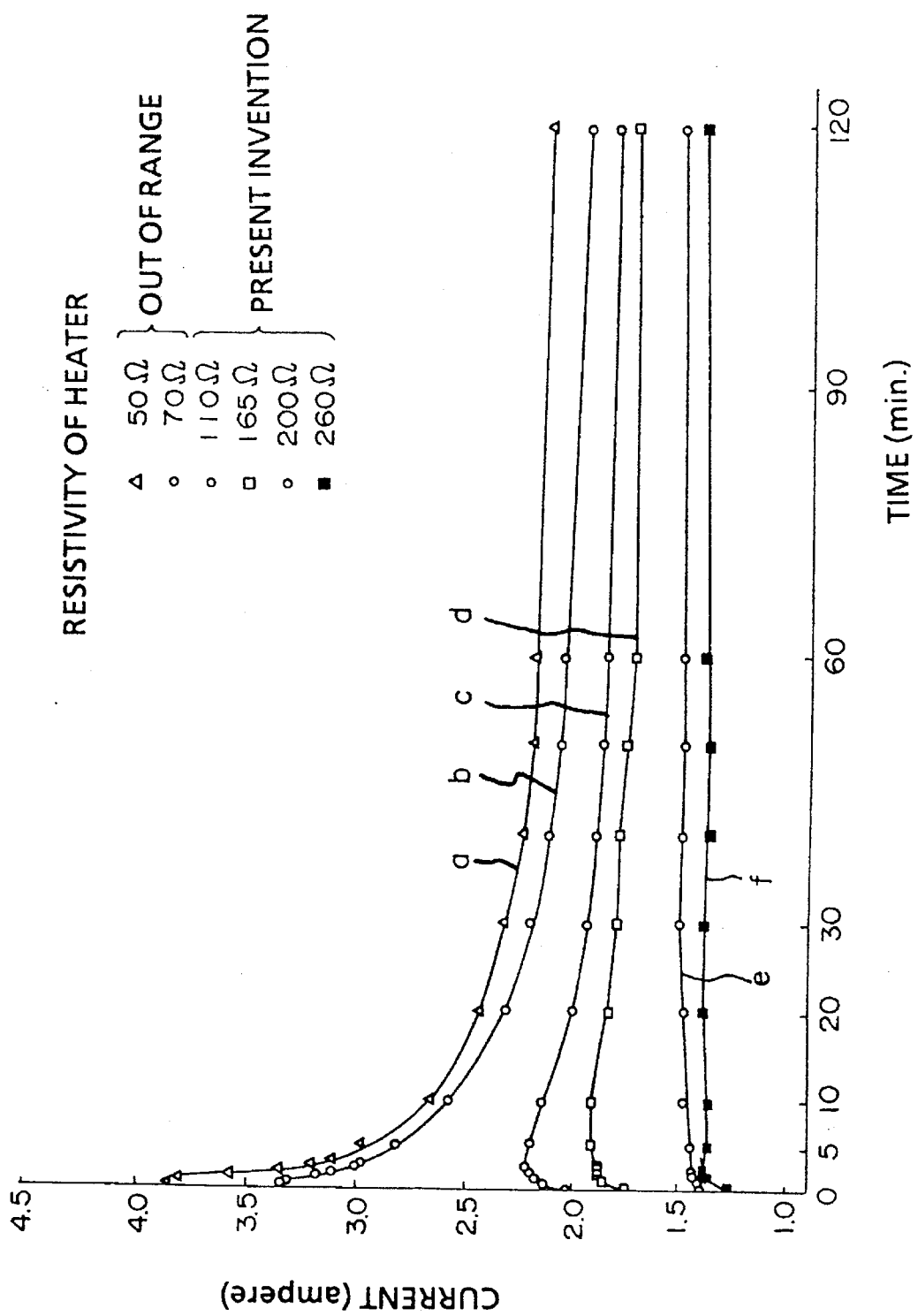
FIG. 11 is a graph of characteristic curves showing the change in current with the passage of time for PTC heater devices according to Example 5, differing in nominal resistance.

In a panel heater 900×900×13 mm in size, for instance, it has been found for those yielding curves c to f as shown in FIG. 11, that the rush current can be greatly reduced by changing the resistance without considerably influencing the power output. It has been also found that the resistance is affected by varying the $\alpha$ value, i.e., an index for defining characteristics of a PTC element.

In the present Example, the temperature coefficient of resistance $\alpha$ is defined as follows:

$\alpha=[2.303 \log(R_{200}/R_2)/\{(T_{200}-T_2)\times 10\}]$ where, $T_{200}$ and $T_2$ represent the temperature at which the resistance is increased respectively to 200 times and 2 times that at 25° C.; and $R200$ and $R_2$ represent the resistance respectively 200 times and 2 times that at 25° C.

Figure 12:
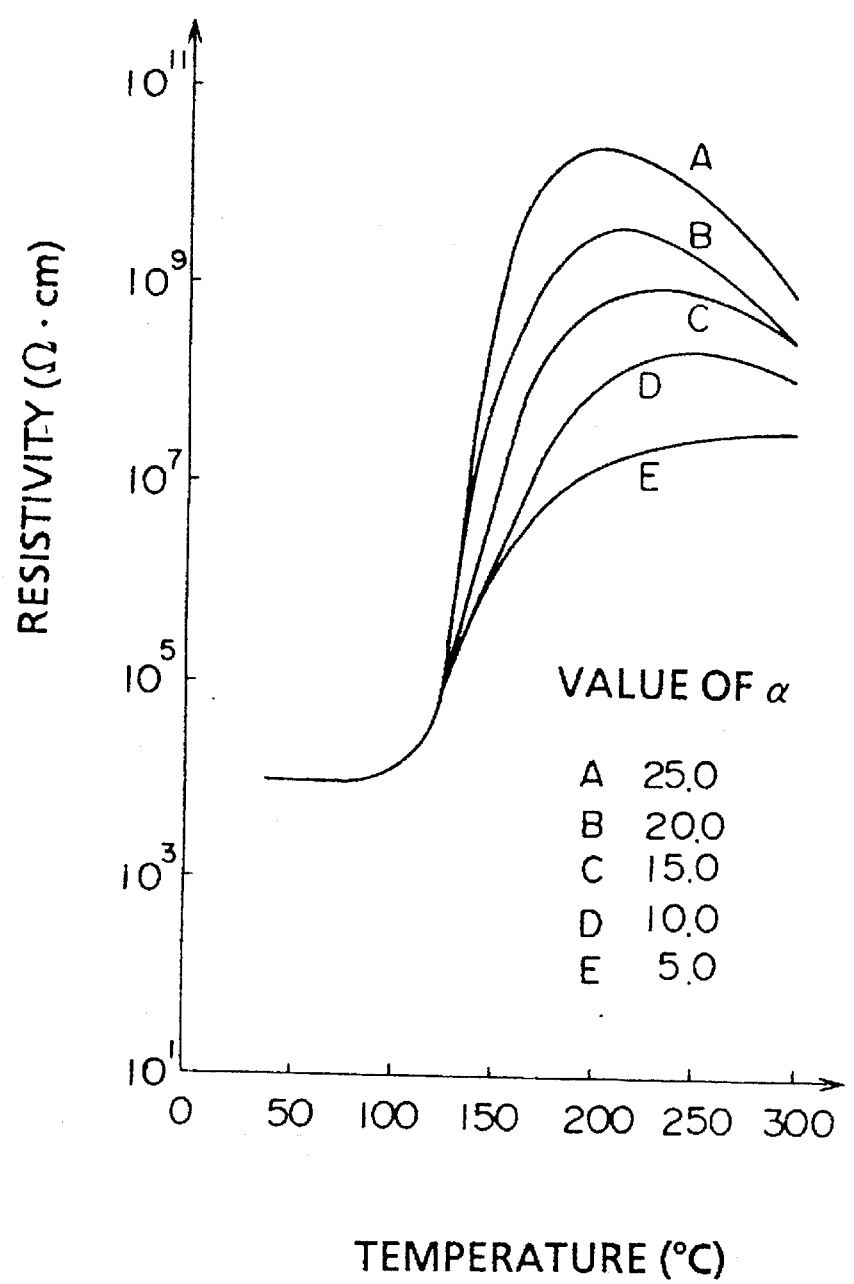
FIG. 12 is a graph showing the influence of α value on the resistivity-temperature characteristics.
Figure 13:
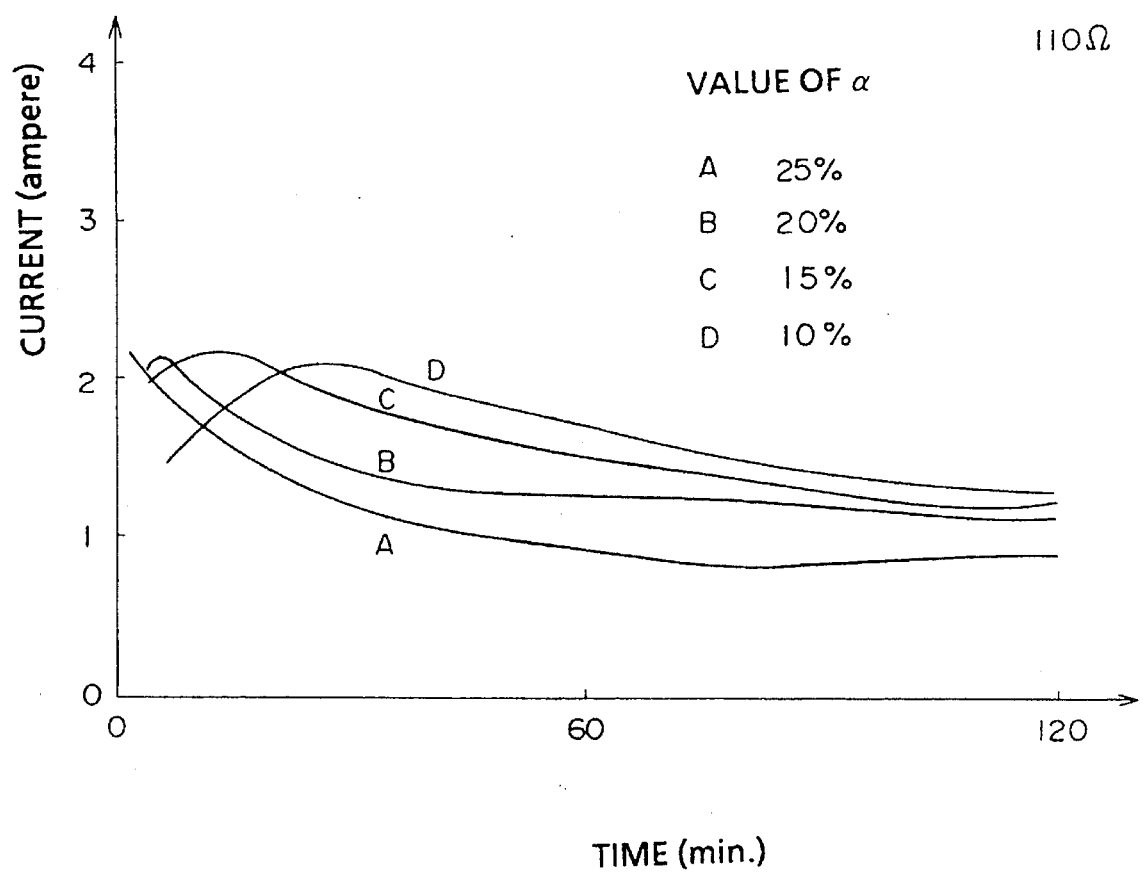
FIG. 13 is a graph showing the influence of α value on the time-current characteristics at a resistance of 110 Ω.
Figure 14:
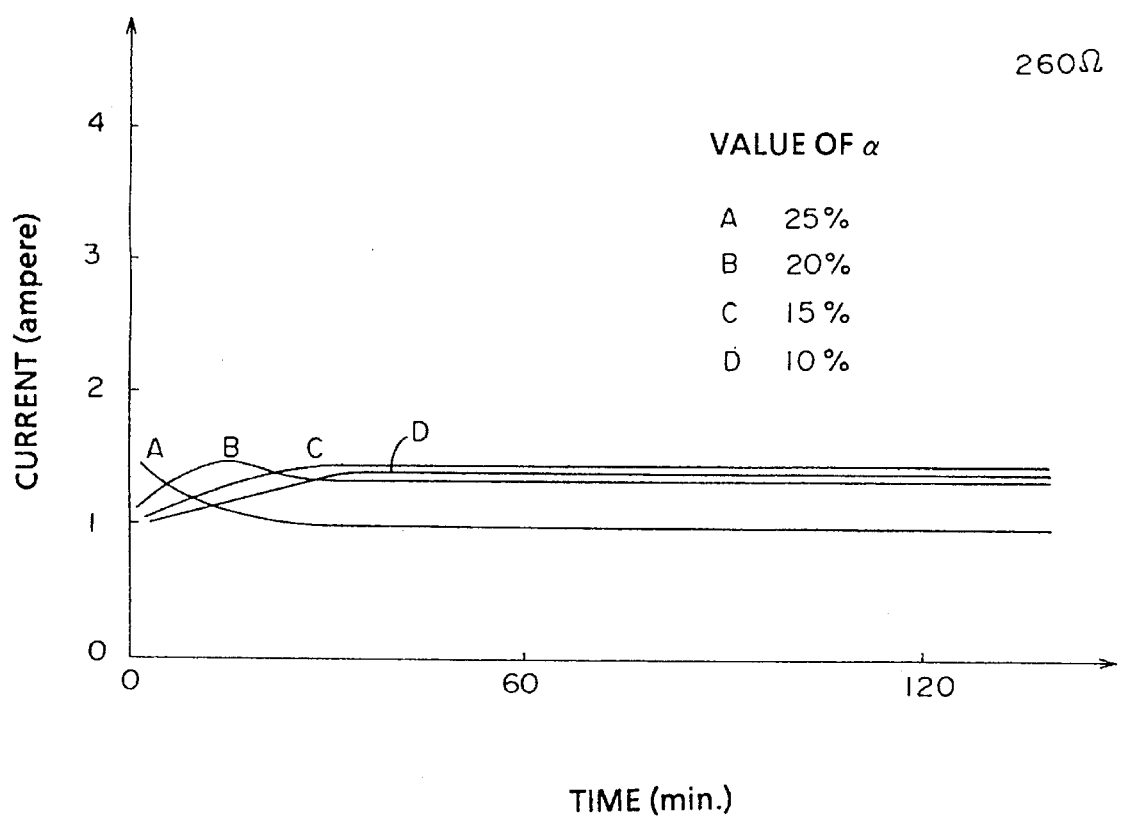
FIG. 14 is a graph showing the influence of α value on the time-current characteristics at a resistance of 260 Ω.

The resistance-temperature characteristic curves at a constant resistance and with varying $\alpha$ value are given in FIG. 12. The time-temperature characteristic curves at a constant resistance and with varying $\alpha$ value are given in FIGS. 13 and 14. As those figures read, the rush current increases with a larger $\alpha$ value to yield a curve having a sharper maximum.

Figure 15:
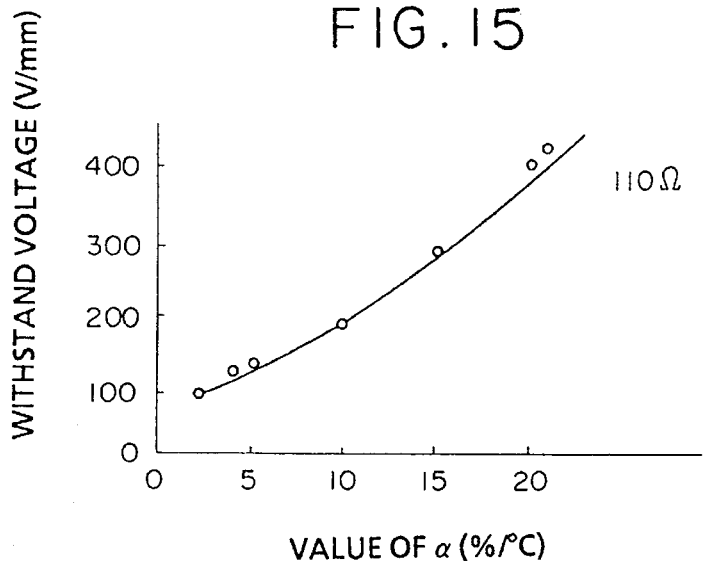
FIG. 15 is a graph which relates the α value to withstand voltage.

The phenomena above can be explained as follows. The PTC elements having a higher $\alpha$ value have a rapid temperature rise and a distinct current limiting effect. However, those elements are more susceptible to heat accumulation at the central portion of the element, i.e., the portion which is heated most rapidly, and thereby the rush current increases due to the pinching effect. It can be seen therefore that the $\alpha$ value be preferably lowered to as low a value as possible. However, as seen in FIG. 15, the withstand voltage reduces with a decreasing $\alpha$ value. It is therefore regulated to keep the distance between the electrodes to 2.5 mm or longer. Furthermore, if a voltage of 100 V were to be applied, a withstand voltage of about twice that is necessary. This signifies that the minimum allowable α value is 5%/°C. If a predetermined constant current were to be obtained at an α value being increased to 20%/°C. or higher, the rush current increases excessively to activate breaker. Thus, it would be undesirable to increase the α value to 20%/°C. or higher.

The rush current may be reduced by allowing the heat generated on the PTC element to diffuse rapidly. In this case, the heat diffusion is delayed if the heat generation occurs mainly from the central portion of the element, because the heat conductivity of the PTC element is not so high as that of a metal. This requires that the central portion of the element does not have a high resistivity as measured along the direction of thickness. The time-current characteristic curves with varying resistivity are shown in FIG. 16.

Figure 16:
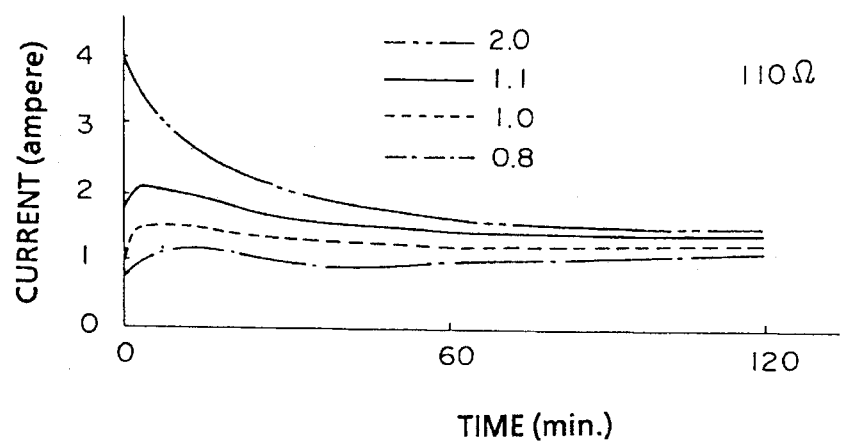
FIG. 16 is a graph showing time-current characteristics with a changing resistivity ratio.

As FIG. 16 shows, the rush current increases even when the resistance is maintained at a constant, with an increasing ratio of the resistivity of the surface portion to the resistivity of the inner portion. It can be seen further that the curve at a ratio of 1.1 coincides with the breaker characteristics, and that therefore the ratio should be maintained no higher than 1.1.

The term "resistivity of the surface portion" as mentioned above signifies the resistivity of the portions falling within one third of the distance between the electrodes as measured from the two surface electrode sides, and the term "resistivity of the inner portion" signifies that of the central portion falling in the remaining one third of the distance between the electrodes.

The foregoing description referred to a PTC element having a Curie point of 110° C., but similar descriptions can be given to those having Curie points of 40° C. and 70° C., allowing for an increase in the surface area and the number of PTC elements to compensate for the drop in output power.

The PTC ceramic elements are fabricated from high purity materials, and the properties thereof are controlled by doping trace amounts of impurities such as $SiO_2$ and $MnO_2$. Among the impurities, $PbTiO_3$ and $SrTiO_3$ are temperature shifters which are added for the purpose of shifting the Curie point of the PTC ceramics; $SiO_2$, $TiO_2$, etc., are added for controlling the grain size to increase the withstand voltage; and the compounds of transition metal elements such as $MnO_2$ are intended to increase the α value and to increase the withstand voltage.

Though high purity starting materials are used, components which are extremely difficult to separate and those having no substantial influence on the characteristics of the resulting sintering were left intact.

Niobium is one such inseparable element which is mostly included in $TiO_2$, one of the raw materials for PTC ceramics, in the form of an oxide $Nb_2O_5$ or $Nb_2O_{5-\delta}$. In general, the elements for rendering the sintering semiconductive are added at an amount of 0.1 to 0.3% by weight. Because $Nb_2O_5$ functions the same as such elements, $Nb_2O_5$ or other rare earth elements are added while taking the amount of the inherent Nb content into account.

Figure 17:
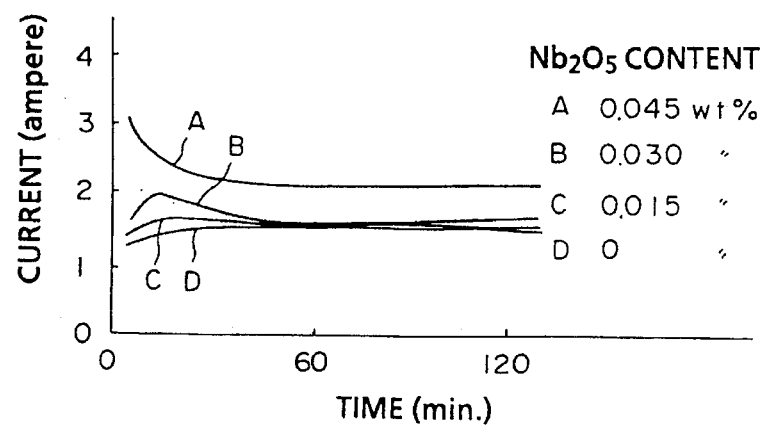
FIG. 17 is a graph showing the influence of the addition of $Nb_2O_5$ on the time-current characteristics.

It has been found, however, that $Nb_2O_5$ has an unfavorable influence on reducing the rush current. FIG. 17 is a graph showing the time-current characteristics of a PTC element with changing $Nb_2O_5$ addition in four levels, i.e., 0.0% by weight, 0.015% by weight, 0.030% by weight, and 0.045% by weight. As FIG. 17 reads, the rush current increases with an increase of $Nb_2O_5$ in obtaining the same stationary current. The effect of the $Nb_2O_5$ addition is yet to be clarified. However, it is believed that $Nb_2O_5$ cannot be incorporated into the ceramic sintering in the form of a completely uniform solid solution because of its high activity, and that it is apt to remain in the grain boundaries upon the cooling of the sintering.

Ideally, a single barrier layer is formed in the ceramic sintering. However, a layer comprising $Nb_2O_5$ as the principal component is formed at the same time, and it behaves as an ordinary semiconductor layer. That is, the PTC ceramics as a whole become more dependent on voltage and allow more current to be conducted than the current defined by the apparent resistance-temperature characteristics. In this manner, the rush current increases along with the additions of $Nb_2O_5$.

The change of current with passage of time was measured on a panel heater having a structure as shown in FIG. 8, while varying the resistance (before applying voltage) of the PTC element to yield a panel resistance of 50, 70, 110, 165, 200, and 260 Ω. The results are given in FIG. 11.

As shown in FIG. 11, the panel heaters yielding curves a and b have too large a rush current with respect to the stationary current, to the point that a current below the activating point of the breaker cannot be achieved within 4 minutes. Thus, panel heaters yielding curves c and below were selected for use.

The product P×R for the curves a to f can be calculated from the characteristics which can be read on FIG. 11 as follows.

Curve a (having a resistance of 50 Ω): P×R=1.06×10$^4$
Curve b (having a resistance of 70 Ω): P×R=1.35×10$^4$
Curve c (having a resistance of 110 Ω): P×R=2.00×10$^4$
Curve d (having a resistance of 165 Ω): P×R=2.84×10$^4$
Curve e (having a resistance of 200 Ω): P×R=2.98×10$^4$
Curve f (having a resistance of 260 Ω): P×R=3.59×10$^4$ If a home-use breaker with a maximum allowable current range of 12 A were to be serially connected, it can be shown by simple calculation that five panels, each represented by the characteristic curve a and each having a current demand of 2.12 A, can be installed. However, because this panel has a rush current as large as 3.9 A as read from FIG. 11, the breaker will activate if five panels are connected. In practice, the maximum allowable number of such panels has been three. Similarly, up to three panels, each having a characteristic curve b, are generally allowed to be connected.

In contrast to the cases above, the panels according to the present Example and represented by the characteristic curves c to f yielded negligible rush current, or a rush current well below that which would activate the breaker. Accordingly, those panels can be specified by the output of the stationary state.

More specifically, the panels defined by the characteristic curves c to f were subjected to experimentation to see how many panels could be connected to a home-use breaker. It has been found as a result that six panels for those of curves c and d, and eight panels for those of curves e and f, can be connected. This is a 2 to 3-fold improvement over those panels exhibiting characteristics with curves a and b.

In the present Example, PTC elements of 2.5 mm thickness were used. Thicker PTC elements may be used without any restriction, but those of 1.5 mm or less are unfavorable because they may suffer low withstand voltage or an increased rush current due to the ease in conducting heat from the central portion of the element to the heat radiation side.

As explained in the foregoing, the present invention provides a panel heater of considerably reduced rush current. Accordingly, with such a panel heater, the number of panels allowable for connection may be set in accordance with the stationary output power of the panel heater. Such panel heaters, as a consequence, can heat a much larger area.

EXAMPLE 6

Figure 18:
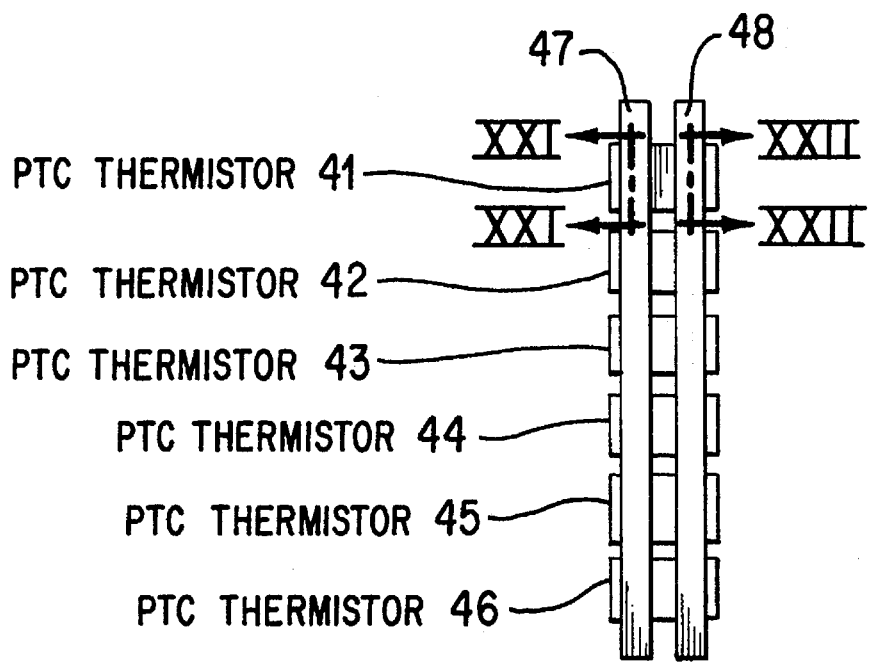
FIG. 18 is a planar view of a PTC heater according to Example 6 of the present invention.
Figure 19:
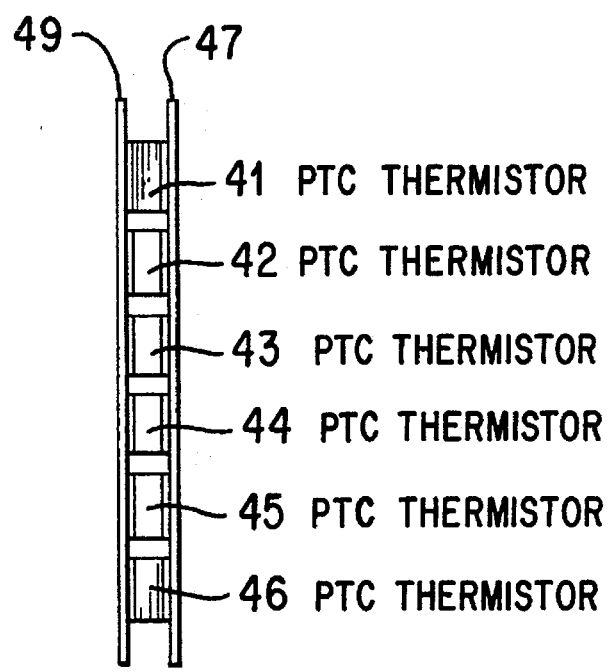
FIG. 19 is a left side view of a PTC heater according to Example 6 of the present invention.
Figure 20:
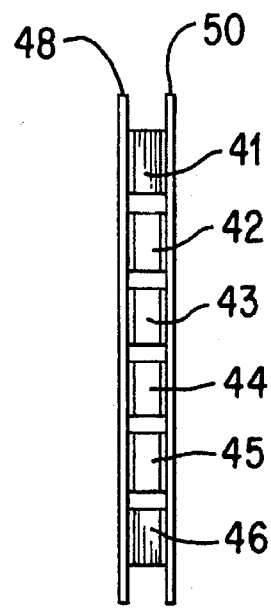
FIG. 20 is a right side view of a PTC heater according to Example 6 of the present invention.

FIG. 18 is a planar view of a PTC heater according to Example 6 of the present invention, and FIGS. 19 and 20 are each a left side view and a right side view of the same PTC heater, respectively. As shown in FIG. 18, the PTC thermistors 41 to 46 are connected by the upper side thereof with the upper left electrode sheet 47 and upper right electrode sheet 48. The lower sides of the PTC thermistors 41 to 46 are connected to the lower left electrode sheet 49 and the lower right electrode sheet 50. The electrode sheets 47, 48, 49, and 50 are each electrically disconnected with each other.

Figure 21:
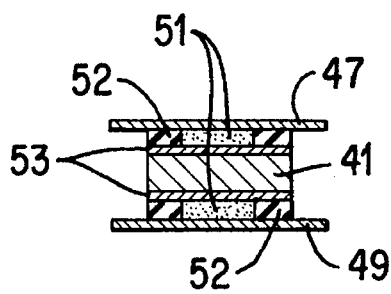
FIG. 21 is a cross sectional view of a PTC heater according to Example 6 of the present invention, taken along line 21—21 of FIG. 18.

FIG. 21 is a cross sectional view of the PTC heater above, taken along line 21—21 of FIG. 18. The upper side of the PTC thermistor 41 is adhered to the upper left electrode sheet 47 using an electrically conductive adhesive 51 and an insulating adhesive 52 to assure the electric connection. The lower side of the PTC thermistor 41 is connected electrically to the lower left electrode sheet 49 in the same manner as the upper side of the same thermistor. Both of the principal planes of the PTC thermistor 41 are covered with an electrode film 53.

Figure 22:
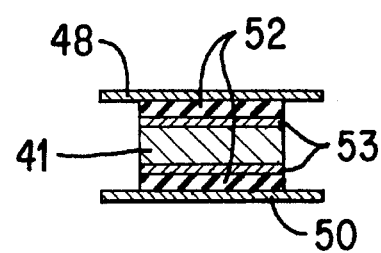
FIG. 22 is a cross-sectional view of a PTC heater according to Example 6 of the present invention, taken along line 22—22 of FIG. 18.

FIG. 22 is a cross sectional view of the same PTC heater, taken along line 22—22 of FIG. 18. The upper side of the PTC thermistor 41 is electrically insulated, but connected to the upper electrode sheet 48 using an insulating adhesive 52. Similarly, the lower side of the PTC thermistor 41 is electrically insulated and adhered to the lower right electrode sheet 50.

The electric connection and disconnection of each of the PTC thermistors which can be realized by selecting the connecting electrode sheets are shown in Tables 1 and 2 below. Table 1 shows the result for the cases in which a single electrode sheet is selected, and Table 2 shows those in which a combination of two or more electrode sheets are selected. By combining the selected electrodes for applying the current, the number of the PTC thermistors to be turned on can be selected to change the heat radiation and the output power of the PTC heaters.

TABLE 1

| Electrode No. | Connection state of Electrodes | | | | Combination of Electrodes to which Current is applied | | | |
| --- | --- | --- | --- | --- | --- | --- | --- | --- |
|  | 7 | 8 | 9 | 10 | 7–9 | 7–10 | 8–9 | 8–10 |
| PTC thermistor 1 | ○ | × | ○ | × | ⊙ |  |  |  |
| PTC thermistor 1 | × | ○ | × | ○ |  |  |  | ⊙ |
| PTC thermistor 1 | ○ | × | × | ○ |  | ⊙ |  |  |
| PTC thermistor 1 | × | ○ | ○ | × |  |  | ⊙ |  |
| PTC thermistor 1 | ○ | × | × | ○ |  | ⊙ |  |  |
| PTC thermistor 1 | × | ○ | × | ○ |  |  |  | ⊙ |
| Number of heated PTC thermistors |  |  |  |  | 1 | 2 | 1 | 2 |

Note:
○: Electrically connected;
×: Insulated;
⊙: PTC thermistor to be heated by applying current.

In the Example above, two electrodes were provided on each of the two principal planes. However, a common electrode may be provided to one of the principal planes of all the PTC thermistors, and a plurality of electrodes may be established on the other principal plane of the thermistors. In another manner, two or more electrodes can be provided to both of the principal planes of the PTC thermistors.

The results of the present Example can be summarized as follows.

(1) The power output of the PTC heater according to the present Example can be varied by using a single heating element. Accordingly, a far more compact PTC heater than is conventional can be provided at a reduced cost.

(2) The power output of the PTC heater according to the present Example can be divided arbitrarily into steps by increasing the number of electrodes. Accordingly, the PTC heaters serve as more comfortable general use heaters.

(3) The PTC heater according to the present Example comprises open spaces on the side provided thereon with a plurality of electrodes. It can be seen that the heat conductivity of such a side is impaired as compared with that of a side provided thereon with a single electrode. Accordingly, by applying the PTC heater of the present Example for a device which emits heat only from one side of the panel, such as a panel heater for floor heating, heat loss can be reduced and an energy-efficient device can be realized, provided that the side provided with a plurality of electrodes is used as the back side of the heater.

EXAMPLE 7

Figure 23:
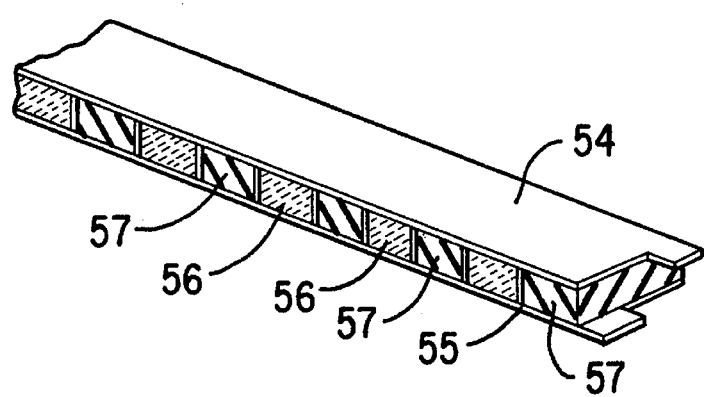
FIG. 23 is a perspective view of a PTC thermistor heater device of the present invention according to Example 7.

FIG. 23 is a perspective view of a PTC thermistor heater device of the present invention according to Example 7, which comprises an upper electrode sheet 54 and a lower electrode sheet 55. Brass sheets each 800 mm×25 mm×0.3 mm in size were used as the electrode sheets in the present Example. The device comprises equally spaced PTC ceramic elements 56 being incorporated between the upper and the lower electrode sheets 54 and 55. Barium titanate (BaTiO$_3$) ceramics, for example, may be used as the PTC ceramic elements 56. A mica sheet was used as the insulating material 57 because of its excellent heat resistance and insulation properties. The insulating material 57 provided was at the same thickness as the PTC ceramic element 56. More specifically, a mica sheet machined to a thickness of 2.5 mm was adhered to the electrode sheets 54 and 55 with an adhesive.

|  | Connection state of Electrodes | | | | |
| --- | --- | --- | --- | --- | --- |
| Electrode No. | (7 + 8) – 9 | (7 + 8) – 10 | (7 + 8) – 9 | (7 + 8) – 9 | (7 + 8) – (9 + 10) |
| PTC thermistor 1 | ⊙ |  | ⊙ |  | ⊙ |
| PTC thermistor 2 |  | ⊙ |  | ⊙ | ⊙ |
| PTC thermistor 3 |  | ⊙ | ⊙ |  | ⊙ |
| PTC thermistor 4 | ⊙ |  |  | ⊙ | ⊙ |
| PTC thermistor 5 |  | ⊙ | ⊙ |  | ⊙ |
| PTC thermistor 6 |  | ⊙ |  | ⊙ | ⊙ |
| Number of Thermistors | 2 | 4 | 3 | 3 | 6 |

Note:
⊙: PTC thermistors to be heated by applying current

Material other than a mica sheet may be used as the insulating material 57 so long as it has excellent insulating characteristics and heat resistance. For example, ceramic materials can be favorably used from the viewpoint of realizing a uniform temperature over the entire material. Furthermore, from the viewpoint of improving thermal efficiency and safety, the PTC elements and the insulating sheet may be subjected to potting to charge therebetween a resin based material and the like.

A large-area panel can be realized by arranging several PTC thermistor heater devices as above, parallel with each other and equally spaced.

As mentioned in the foregoing, the present Example provides a heater comprising an insulating material incorporated into the open spaces between the electrode sheets, thereby improving in strength and safety.

The present invention can be applied to home-use floor heaters and to heaters for warming foodstuffs.

We claim:

1. A PTC heater device comprising a PTC element including $BaTiO_3$ as a principal component thereof and $Nb_2O_5$ as an additive thereof, the amount of Nb in said PTC element is limited to less than 0.03% by weight, thereby suppressing a rush current.

2. A PTC heater device comprising a PTC element having a surface portion and an inner portion, with a ratio of resistivity of the surface portion to resistivity of the inner portion of 1.1–0.8 along the direction of thickness, thereby decreasing a rush current.

3. A PTC heating device as claimed in claim 1 or claim 2, wherein the device yields a product of room temperature resistance and output power at 25° C. of $2.0 \times 10^4$ ($\Omega \cdot W$) or higher, thereby reducing a rush current.

4. A PTC heating device including a PTC element having an $\propto$ value in the range of from 10 to 20%/°C., the device yielding a product of room temperature resistance and output power at 25° C. of $2.0 \times 10^4$ ($\Omega \cdot W$) or higher, thereby reducing a rush current.

5. A method of reducing rush current in a PTC element of a PTC heater device comprising utilizing $BaTiO_3$ as a principal component of said PTC element and $Nb_2O_5$ as an additive thereof, limiting said $BaTiO_3$ to contain less than 0.03% by weight of Nb, and thereby providing a PTC element having reduced rush current.

6. A PTC element having reduced rush current made according to the method of claim 5.

* * * * *

UNITED STATES PATENT AND TRADEMARK OFFICE
CERTIFICATE OF CORRECTION

PATENT NO. : 5,592,647
DATED : January 7, 1997
INVENTOR(S) : Masahiro Yamauchi, et. al.

It is certified that error appears in the above-indentified patent and that said Letters Patent is hereby corrected as shown below:

Title page, item [22], after "PCT Filed:" change "Aug. 25, 1991" to-- Aug. 25, 1992--.

Signed and Sealed this

Sixth Day of May, 1997

Attest:

BRUCE LEHMAN

Attesting Officer

Commissioner of Patents and Trademarks